United States Patent
Healey

(10) Patent No.: US 6,468,117 B1
(45) Date of Patent: Oct. 22, 2002

(54) TROLLING MOTOR FOOT CONTROL WITH DETENT

(75) Inventor: Robert W. Healey, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/835,833

(22) Filed: Apr. 16, 2001

(51) Int. Cl.[7] .................................................. B60L 15/20
(52) U.S. Cl. ...................................... 440/7; 114/144 E
(58) Field of Search ....................... 440/6, 7; 114/144 E

(56) References Cited

U.S. PATENT DOCUMENTS

| | | |
|---|---|---|
| 5,069,642 A | 12/1991 | Henderson |
| 5,088,943 A | 2/1992 | Henderson |
| 5,108,322 A | 4/1992 | Henderson |
| 5,112,258 A | 5/1992 | Folsom |
| 5,129,845 A | 7/1992 | Henderson |
| 5,171,173 A | 12/1992 | Henderson et al. |
| 5,465,633 A | * 11/1995 | Bernloehr .................... 114/153 |
| 5,525,081 A | 6/1996 | Mardesich et al. |
| 5,618,212 A | 4/1997 | Moore |
| D408,827 S | 4/1999 | Cook, III et al. |

* cited by examiner

*Primary Examiner*—Jesus D. Sotelo
(74) *Attorney, Agent, or Firm*—Fellers, Snider, Blankenship, Bailey & Tippens, P.C.

(57) ABSTRACT

A foot control unit for controlling the directional orientation of a trolling motor. The foot control unit includes an upper pivotal foot pedal and a lower flat base member to which the foot pedal is pivotally attached. The foot control unit further includes an offset hinge consisting of an upper hinge member pivotally attached at a first end thereof to the foot pedal and a lower hinge member pivotally attached at a first end thereof to the base member, the hinge members being pivotally attached to each other at respective ends thereof which are opposite from said first ends thereof, and a detent mounted on the offset hinge unit and responsive to a predetermined degree of pivotal movement of the upper hinge member with respect to the lower hinge member to provide a temporary stop in the pivotal movement.

4 Claims, 5 Drawing Sheets

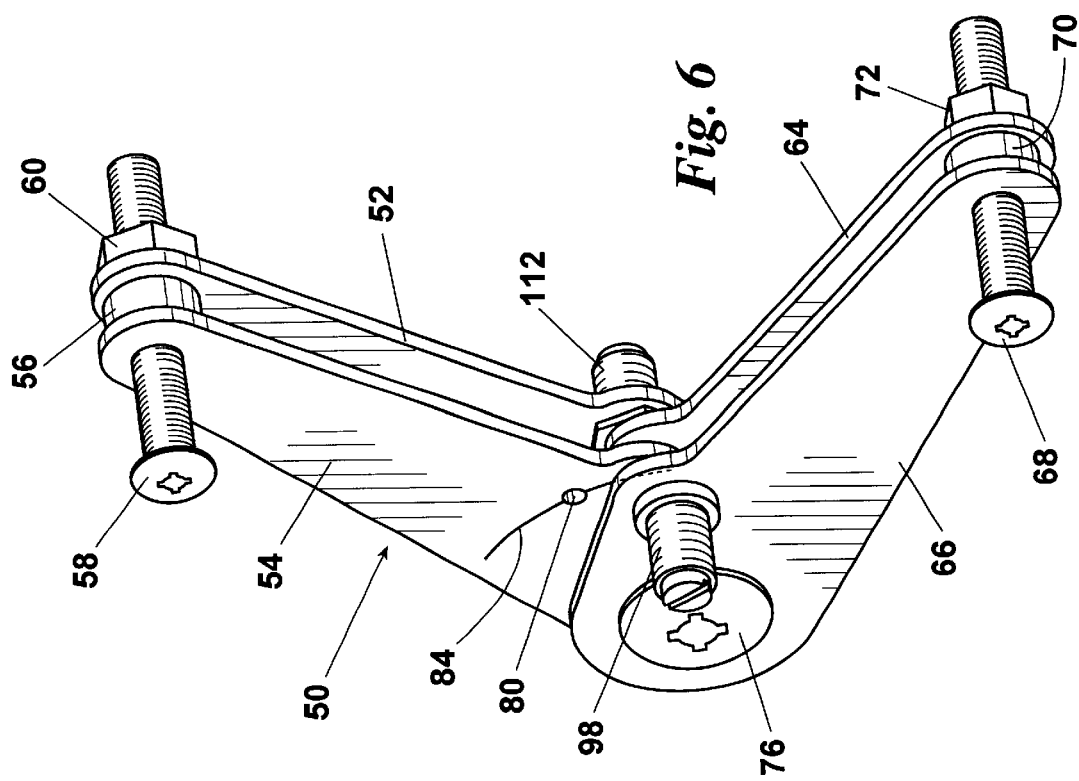
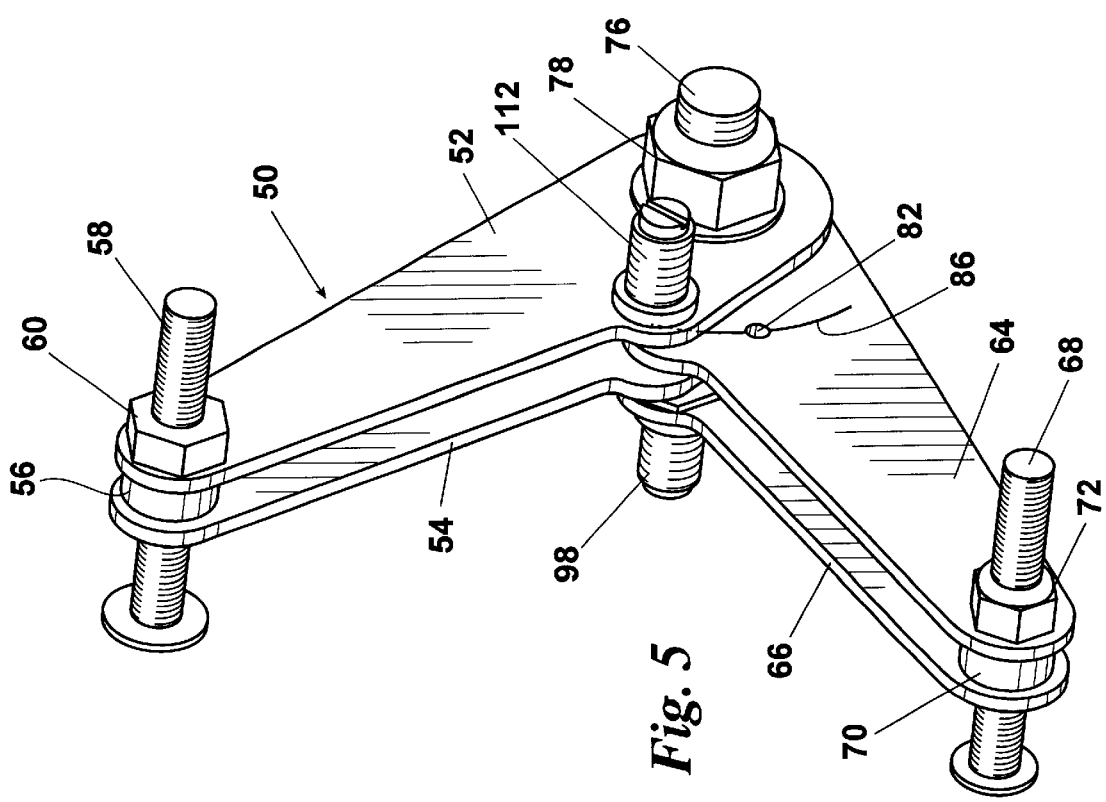

TROLLING MOTOR FOOT CONTROL WITH DETENT

BACKGROUND OF THE INVENTION

1. Field of the Invention

This invention relates generally to a trolling motor for a fishing boat. More particularly, but not by way of limitation, the present invention relates to a trolling motor whose steering is controlled by a pivotal foot pedal.

2. Background

Trolling motors are well known in the art. Generally speaking, a trolling motor includes a small electric (drive) motor coupled to a propeller for quietly adjusting the position of a fishing boat at relatively low speeds. The term "trolling motor" is a recognized term of art and is considered to describe not only the actual drive motor for the propeller but also all (except for the battery) that is necessary to mount the "trolling motor" to the boat. Thus, a "trolling motor" can be considered generally to include the actual drive motor, the propeller, the motor housing which includes the latter two elements, a support column which connects vertically to the motor housing, a mounting bracket for attaching the assembly to a boat and connected to the upper end of the support column, a speed control device, a direction control device (except when the steering is manual), and a control head for receiving signals from direction control devices and/or speed control devices to control the speed and direction of movement. Other items may be considered as part of the "trolling motor" depending upon the given manufacturer.

Trolling motors are available with a variety of features and options. It is known to provide a trolling motor whose steering is controlled by a foot control unit. However, it is not known to provide a pivotal foot pedal which incorporates a ball-detent device to modify the operation of the foot pedal.

SUMMARY OF THE INVENTION

The present invention provides a trolling motor with a foot control unit which includes an upper pivotal foot pedal and a lower stationary base member to which the foot pedal is pivotally attached along an axis which generally includes a servo or similar device (not shown, but which is well known in the art and which is capable of producing a signal representing the pivotal position of the foot pedal). In addition to the pivotal connection referred to above which constitutes a first hinge connection, the foot control unit includes an offset hinge unit which extends between the pivotal foot pedal and the stationary base member. The offset hinge unit has a pair of spaced upper arms and a pair of spaced lower arms, which connect to the upper arms at a more or less central joint. The upper end of the offset hinge unit is connected to the inside lower surface of the pivotal foot pedal, whereas, the lower end of the offset hinge unit connects with the inside upper surface of the stationary base member.

Traditionally, steering is accomplished by pivoting the foot pedal; toe down, generally means that the steering column will be turned to the left or counterclockwise; heel down, means that the steering column will be turned to the right or clockwise.

One of the novel features of the present invention involves a pair of detents located on the offset hinge members, the detents being actuated simultaneously when the pivotal foot pedal is at a predetermined position with respect to the base member. At this point in time, the operator of the foot unit can sense, by his own feeling, that the foot pedal is at an engaged position by virtue of these detents. The detents are preferably located on the offset hinge members to correspond to a "straight ahead" steering position. This allows the operator to know without trial and error and without resort to a visual indicator when the underwater lower unit of the trolling motor is properly positioned so as to achieve a desired straight-ahead course. Of course, by exerting a little force, the pivotal foot pedal can be moved in either direction beyond the position of the detent. Nevertheless, by adjusting the steering orientation of the trolling motor manually to a dead ahead position when the detents are engaged, the operator knows thereafter that the trolling motor will be disposed in a straight ahead mode.

Other objects, features and advantages of the present invention will be apparent to those skilled in the art upon examining the accompanying drawings and upon reading the following description of the preferred embodiments.

BRIEF DESCRIPTION OF THE DRAWINGS

FIG. 5 is a perspective view of the offset hinge unit which is interconnected between the pivotal foot pedal and the lower base member.

FIG. 6 is a perspective view of the same elements shown in FIG. 5, but taken from the opposite side of the offset hinge unit.

DETAILED DESCRIPTION OF THE PREFERRED EMBODIMENT

Figure 1:
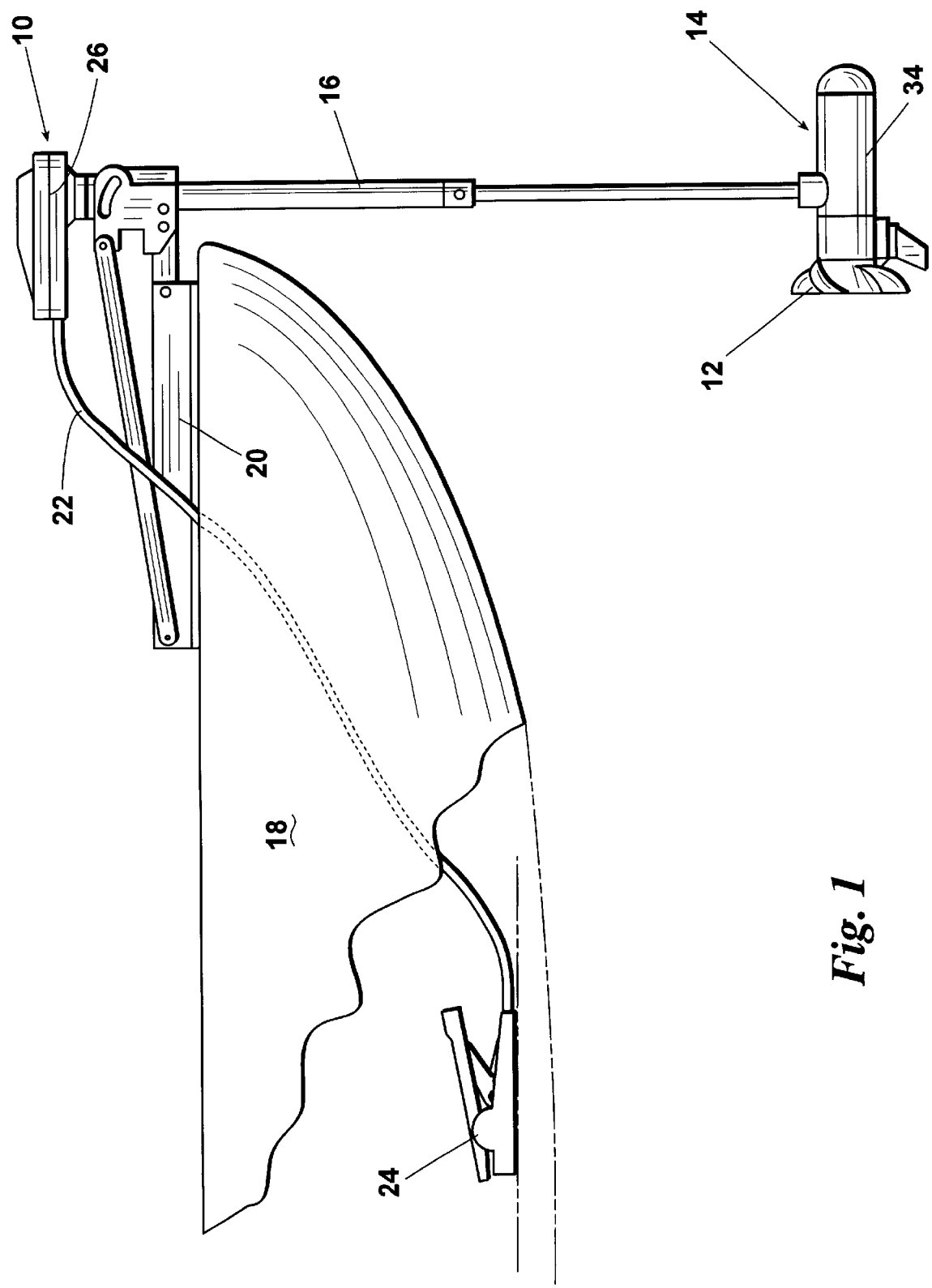
FIG. 1 is a partial side elevation of a portion of a boat to which a trolling motor is attached together with broad details of a foot control unit.

A preferred embodiment of the inventive trolling motor 10 with its foot control unit 24 is shown in its general environment in FIG. 1. Typically, the trolling motor 10 is removably attached to a fishing boat 18 and preferably connected to a foot control unit 24 by means of a control cable 22. The details of the foot control unit 24 will appear hereinafter.

The trolling motor 10 preferably comprises: a motor housing 14 containing drive motor 34 which is drivingly coupled to the propeller 12; support column 16 supporting the motor housing 14 from a mounting bracket 20; control head 26 mounted to the upper end of the support column 16; and cable 22 connecting the foot control unit 24 to the control head 26 for steering purposes. It should be understood that the control head 26 has mounted therein certain devices or elements (not shown but well known in the art) which are responsive to the pivotal movement of a foot pedal 36 in the foot control unit to turn the support column 16, and hence the motor housing 14, to change the directional orientation of the motor housing commensurate with the degree of movement of the foot pedal.

Figure 2:
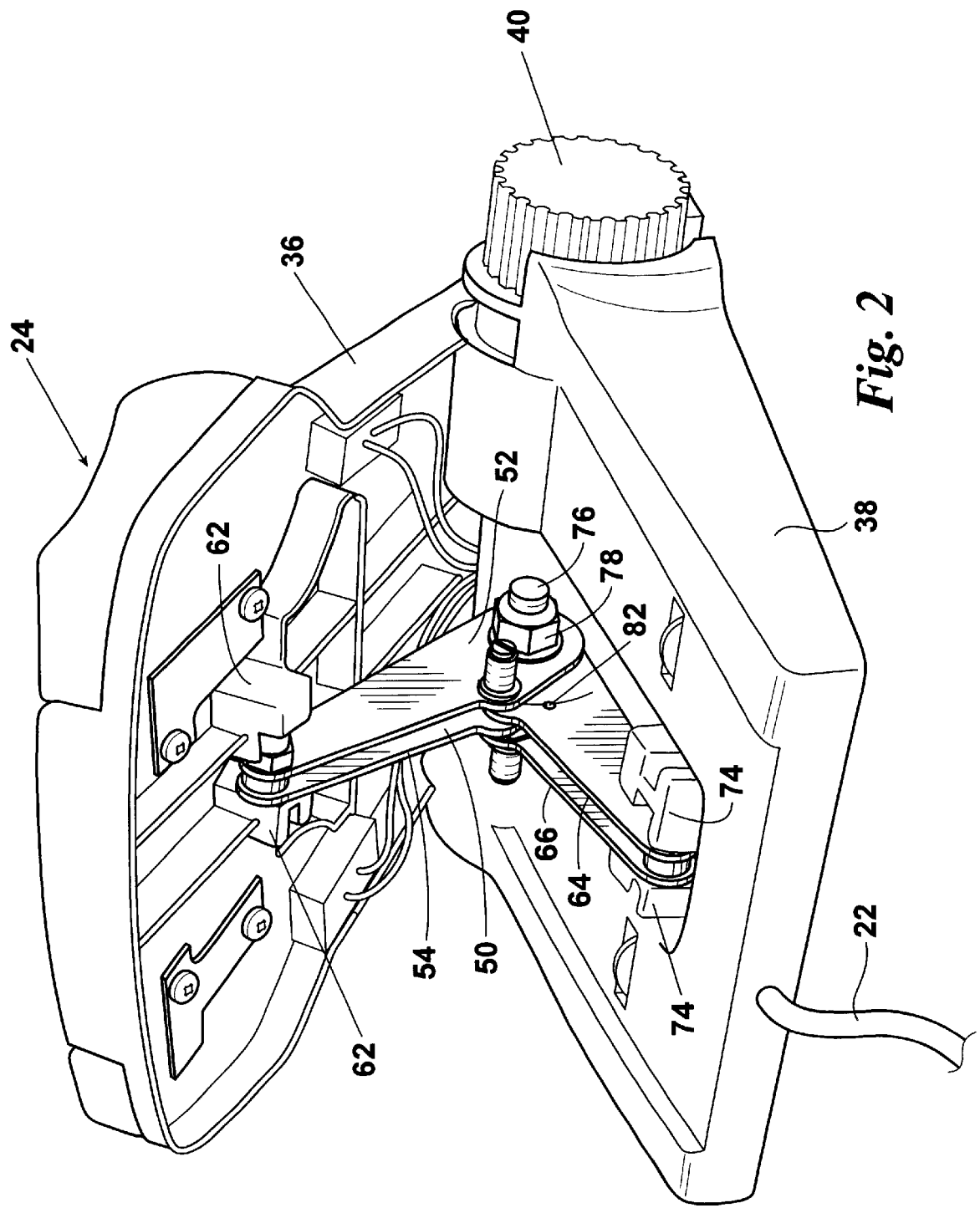
FIG. 2 is a perspective view of the foot control unit showing the pivotal foot pedal opened essentially to its maximum degree with respect to the lower base member.
Figure 4:
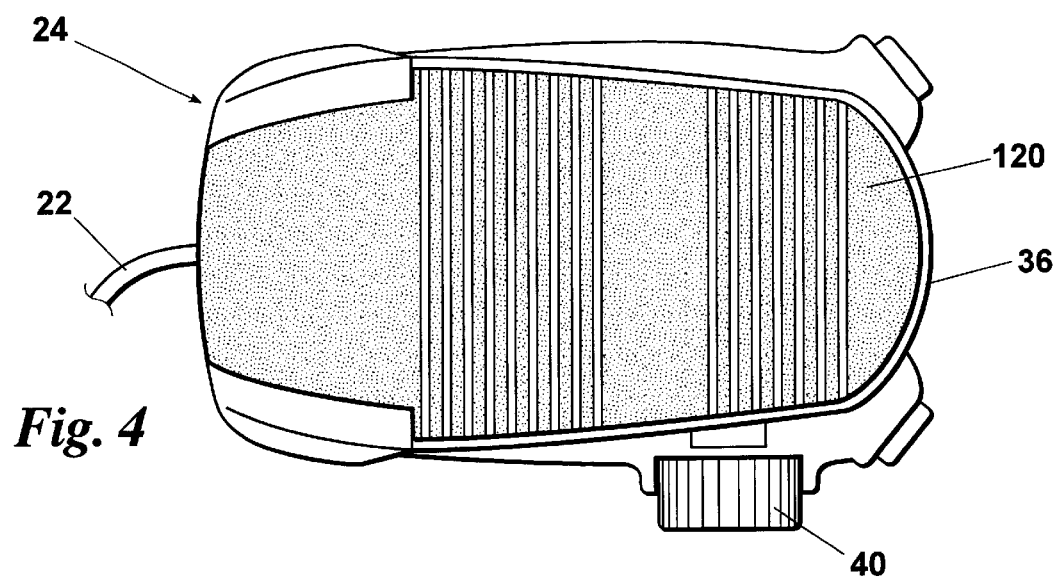
FIG. 4 is a top plan view of the foot control unit.
Figure 3:
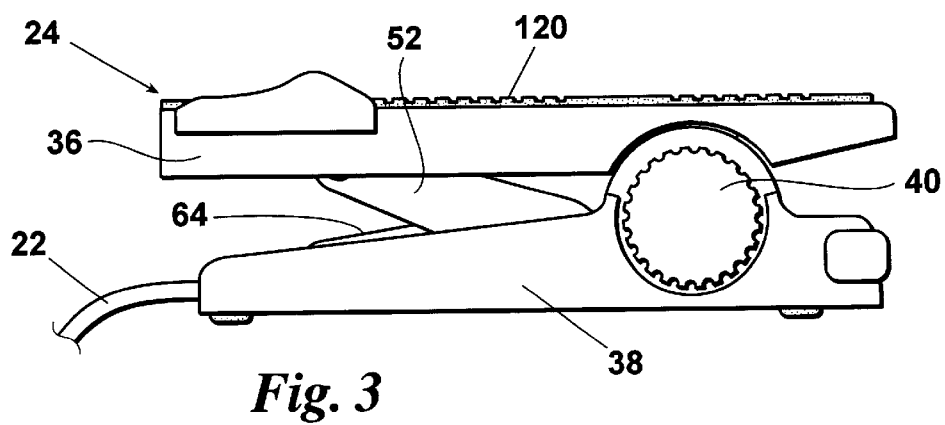
FIG. 3 is a front elevation of the foot control unit shown in FIG. 1.

Referring now to FIGS. 2, 3 and 4, the foot control unit 24 includes an upper pivotal foot pedal 36 and a lower flat base member 38 to which foot pedal 36 is pivotally attached. Also, as best shown in FIGS. 2, 3 and 4, a knurled control knob 40 is mounted towards the right on the base member 38. This control knob 40 is mounted on the pivotal axis (not referenced) for the pivotal foot pedal 36. That is, the center of the control knob 40 is also the center of the pivot axis for the foot pedal 36. The foot pedal 36 is mounted for pivotal movement around the foregoing axis so that it moves pivotally with respect to base member 38. The manner in which this is accomplished is considered to be conventional and therefore is not set forth in any detail. It should also be considered that somewhere along this pivotal axis is a position measuring device (not shown) whose function it is to provide a signal to the control head 26 to direct the control head to turn the support column 16 in response to the movement of the foot pedal.

As stated above, the pivotal movement of the foot pedal 36 with respect to the base member 38 will control the direction of movement of the boat 18. For the purposes of the remainder of this description, it will be assumed that the trolling motor 10 will be in a "right turn" mode (heel down) in FIGS. 2 and 7 and a "left turn" mode (toe down) in FIGS. 3 and 9. As far as FIG. 8 is concerned, this figure represents the "straight ahead" mode, which feature will be explained further in connection with the description of the detents hereinafter.

For the purpose of providing additional support for the pivotal movement of the foot pedal 36 with respect to the base number 38 as well as to provide an intermediate control point (as will hereinafter appear), an offset hinge member 50 is provided as shown in FIGS. 2, 5 and 6.

Referring now particularly to FIGS. 5 and 6, as well as FIG. 2, the offset hinge unit 50 comprises an upper hinge member consisting of a pair of vertically spaced arms 52 and 54 which are separated at their upper ends by a plastic washer 56. A threaded bolt 58 extends through a pair of holes (not referenced) in the upper ends of the arms 52 and 54 and through the center of the washer 56. A nut 60 is conveniently located on the bolt 58 adjacent the arm 52. The upper bolt 58 is adapted to be received in plastic supporting elements 62 on the inside of the pivotal foot pedal 36. The offset hinge 50 also includes a lower hinge member consisting of a pair of lower spaced arms 64 and 66 which extend rearwardly from a bolt 68 and towards the lower ends of the arms 52 and 54. The forward ends of the arms 64 and 66 (where they connect with the bolt 68) are separated by a plastic washer 70 and a nut 72 is received on the bolt 68 adjacent the arm 64. The ends of the bolt 68 are conveniently received in a pair of plastic supporting elements 74 located along the upper surface of the base member 38, this connection being similar to the connection of the bolt 58 to the supporting elements 62.

The lower ends of the arms 52 and 54 are connected to the outer ends of the arms 64 and 66 by means of a bolt 76 and a nut 78. Thus there is provided an offset hinge 50 which is pivotally connected at its upper end to the foot pedal 36 through the bolt 58, and pivotally connected to the base member 38 through the bolt 68.

Figure 7:
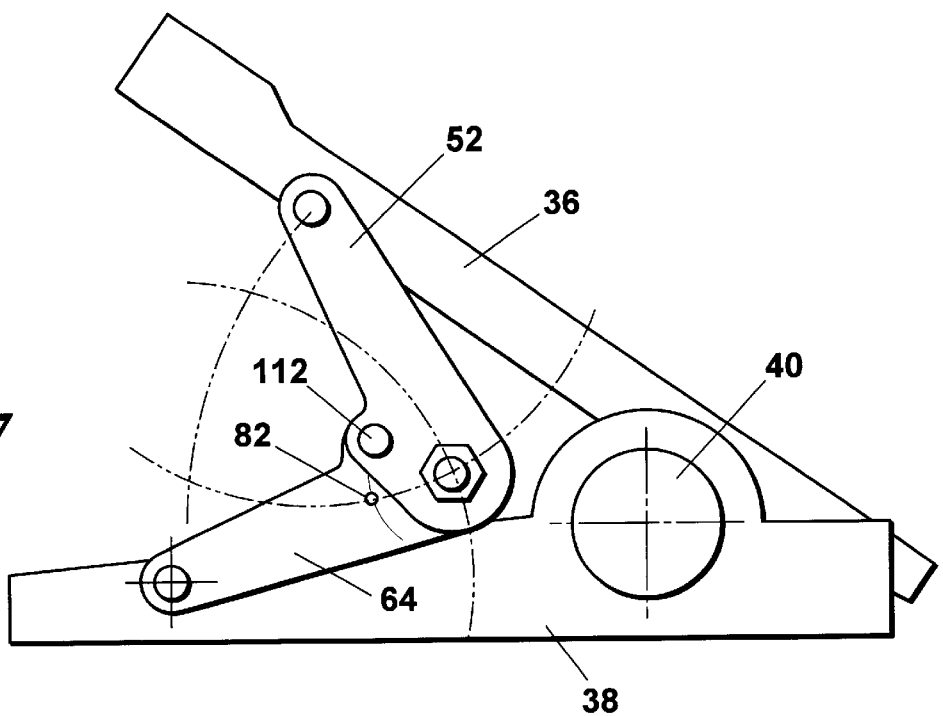
FIG. 7 is a semi-diagrammatic side elevation of the foot control unit showing the pivotal foot pedal in its maximum, clockwise position with respect to the base member.
Figure 8:
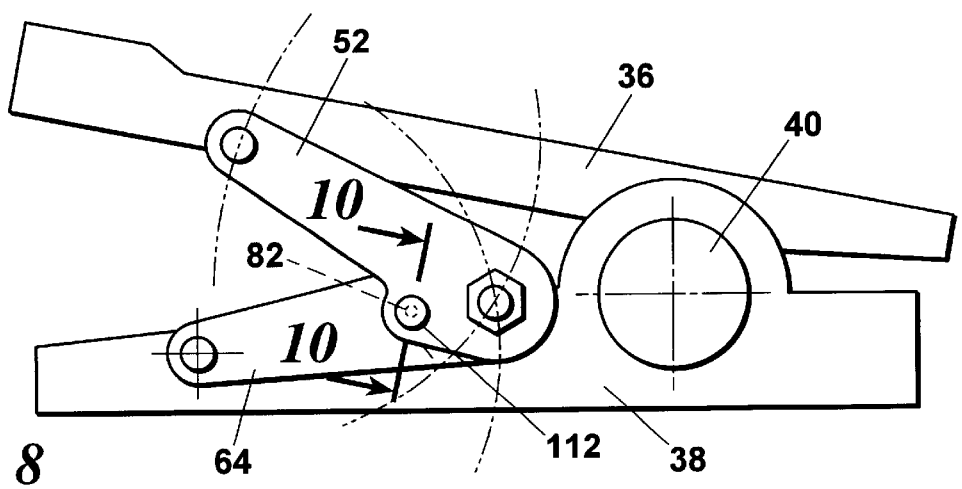
FIG. 8 is a view similar to FIG. 7, but showing the pivotal foot pedal in a position which represents the engaging of the preferred detent on the arms of the offset hinge unit.
Figure 9:
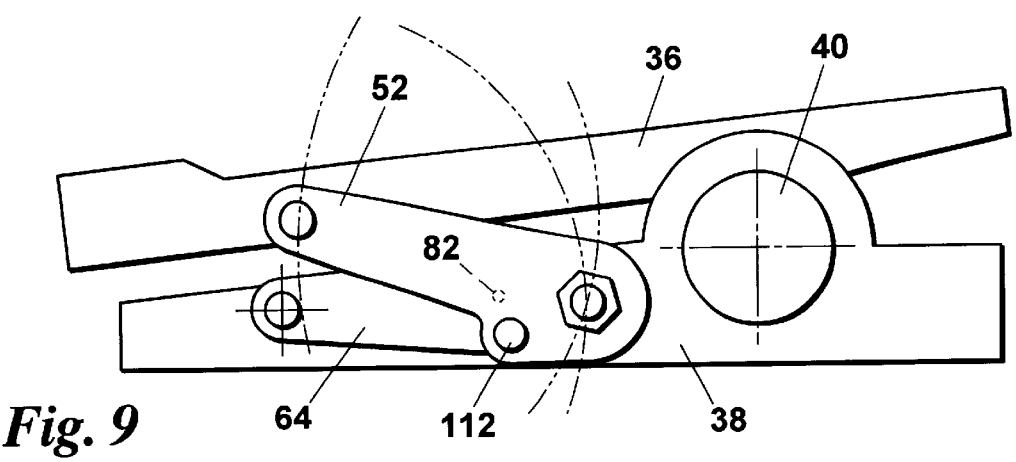
FIG. 9 is a view similar to FIGS. 7 and 8, but showing the pivotal foot pedal in its maximum counterclockwise position with respect to the base member.

FIGS. 2 and 7 show the maximum open position of the foot pedal 36 with respect to the base member 38. FIG. 8 shows an intermediate position of the foot pedal 36 in relation to the base member 38. This position can be referred to as the "detent position," which will be explained hereinafter. In FIG. 9, the foot pedal 36 is in its maximum "closed" position (toe down) in relation to the base member 38.

Frequently, the operator will desire to assume an "ideal" straight ahead position where, for example, the foot pedal 36 will be related to the base member 38 in a manner similar to that shown in FIG. 8. If the trolling system shown in these drawings has been properly calibrated in advance, the FIG. 8 position will result in a steering of the boat in a straight ahead mode. Minor adjustments or fine tuning for precise direction may be made with other manual controls in a manner well known in the art. In order to assure that the operator can return to the position in FIG. 8 at any time he wishes, this invention provides, first of all, a small hole 80 in the arm 54 and another small hole 82 in the arm 64. As shown in FIGS. 5 and 6, the holes 80 and 82 are located generally midway between the ends of arcs 84 and 86. These arcs 84 and 86 represent the paths of movement of the balls 88 and 90 over the outboard surfaces of the arms 54 and 64, respectively. The holes 80 and 82 are visible in FIGS. 5 and 6 only because the arms 52 and 54 are open to their widest position with respect to the arms 64 and 66.

Figure 10:
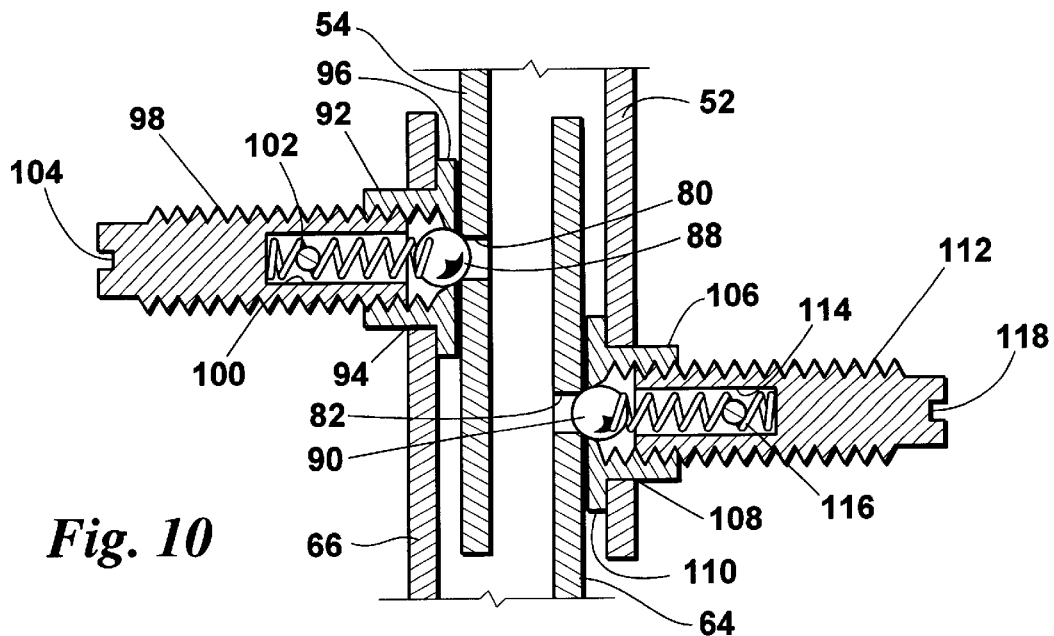
FIG. 10 is a transverse sectional view taken along section line 10—10 of FIG. 8 showing details of the detents being engaged on the arms of the hinge unit.

Turning now to FIG. 10, this is a partial cross-sectional view taken along section line 10—10 of FIG. 8 and shows that the relationship between the upper arms 52 and 54 and the lower arms 64 and 66 is such that a ball 88 is urged towards the right into the hole 80, whereas a ball 90 is urged towards the left into the hole 82. To this end, a bushing 92 is received in an opening 94 in the arm 66. In the position shown in FIG. 10, which also represents the position shown in FIG. 8, the opening 94 is in alignment with the hole 80. The bushing 92 is received in the hole 94 and a flange 96 prevents the bushing 92 from being urged any further towards the left than as shown in FIG. 10. The interior of the bushing 92 is threaded so as to receive a threaded cylinder 98. The threaded cylinder 98 is provided with a cylindrical cavity 100 in which is received a helical spring 102. The spring in the cavity 100 urges the ball 88 into engagement with the left-hand side of the hole 80. A screwdriver slot 104 is provided on the end of the threaded cylinder 98 to permit minor adjustment of the threaded cylinder.

With respect to the opposite hole 82, a bushing 106 is received in a hole 108, which is located opposite the hole 82. The bushing 106 is provided with a flange 110 similar to the flange 96 on the bushing 92. The interior of the bushing 106 is threaded so as to receive a threaded cylinder 112 essentially the same as the threaded cylinder 98 referred to above. The threaded cylinder 112 is provided with a cylindrical cavity 114 in which is received a helical spring 116, whose function it is to urge the ball 90 into engagement with the right-hand side of the hole 82. Finally, a screwdriver slot 118 is provided at the end of the threaded cylinder 112 to permit minor adjustment of the ball pressure against the opening 82. The pivotal foot pedal 36 is preferably covered with a rubber sheet 120 which will be engaged by the foot of the operator.

Thus, the present invention is well adapted to carry out the objects and attain the ends and advantages mentioned above as well as those inherent therein. While the presently preferred embodiment has been described for purposes of this disclosure, numerous changes and modifications will be apparent to those skilled in the art. Such changes and modifications are encompassed within the spirit of this invention as defined by the appended claims.

What is claimed is:

1. In a foot control unit of the type having an upper pivotal foot pedal and a lower flat base member to which the foot pedal is pivotally attached for controlling the directional orientation of a trolling motor mounted on a boat as part of a trolling motor assembly, the trolling motor assembly comprising a mounting bracket for attaching the assembly to a boat, a support column connected at an upper end to the bracket and extending rotatably downwardly to a lower end, a motor housing connected to the lower end of the support column, the motor housing including a drive motor and a propeller driven thereby, and a control head mounted above the support column for affecting the rotary position of the support column, the improvement comprising an offset hinge unit consisting of an upper hinge member pivotally attached at a first end thereof to the foot pedal and a lower hinge member pivotally attached at a first end thereof to the base member, the hinge members being pivotally attached to each other at respective ends thereof which are opposite from said first ends thereof, and a detent responsive to a predetermined degree of pivotal movement of the upper hinge member with respect to the lower hinge member.

2. A foot control unit as set forth in claim 1 wherein the upper hinge member consists of a pair of spaced upper arms which have upper ends and opposite lower ends, the upper ends of the vertical arms connecting pivotally to the foot pedal, the lower hinge member consisting of a pair of spaced lower arms having forward ends and opposite rear ends, the forward ends of the lower arms connecting pivotally to the base member, the lower ends of the vertical arms connecting with the rear ends of the lower arms at a hinge joint, the vertical arms pivoting around the hinge joint with respect to the lower arms whenever the foot pedal pivots in relation to the base member.

3. A foot control unit as set forth in claim 2 wherein the detent is comprised of a hole in an arm of one of the hinge members, a spring-loaded ball on an arm of the other of the hinge members, the ball being so positioned on its arm as to trace a path over the arm on the one hinge member and over the hole therein, the ball being received partly in the hole when the predetermined degree of pivotal movement is reached by the one hinge member.

4. A foot control unit as set forth in claim 3 wherein the detent is further comprised of a hole in an arm of the other of the hinge members, a spring-loaded ball on an arm of the one hinge member, the ball being so positioned on its arm as to trace a path over the arm on the other hinge member and over the hole therein, the ball being received partly in the hole when the predetermined degree of pivotal movement is reached.

* * * * *